United States Patent
Conner, Sr.

[15] 3,665,955
[45] May 30, 1972

[54] SELF-CONTAINED VALVE CONTROL SYSTEM

[72] Inventor: George Eugene Conner, Sr., 5559 Hollysprings, Houston, Tex. 77027

[22] Filed: July 20, 1970

[21] Appl. No.: 56,262

[52] U.S. Cl............................137/495, 251/131, 251/133, 166/65, 166/117.5, 166/224
[51] Int. Cl..................H04b 13/00, H04b 1/20, H04b 1/02
[58] Field of Search..................137/495, 497, 498, 460; 251/248, 249.5, 250.5, 131, 133; 166/224, 65 R, 117.5, 117.6

[56] References Cited

UNITED STATES PATENTS

| | | | |
|---|---|---|---|
| 2,363,793 | 11/1944 | Johnson | 166/65 R |
| 2,705,167 | 3/1955 | Layne et al. | 166/65 R |
| 3,032,111 | 5/1962 | Corley, Jr. et al. | 166/65 R |
| 3,189,044 | 6/1965 | Sizer | 137/498 |
| 3,273,588 | 9/1966 | Dollison | 137/498 X |
| 3,398,762 | 8/1968 | Fredd | 137/495 |
| 3,398,928 | 8/1968 | Fredd | 137/495 X |

Primary Examiner—Robert G. Nilson
Assistant Examiner—Robert J. Miller
Attorney—Carlos A. Torres

[57] ABSTRACT

The valve control system of the present invention includes a self-contained operator having a control means and power source adapted to energize a prime mover which in turn is coupled with a motion transmitting means which partially or completely opens or closes a fluid flow passage in a valve. In the preferred form, the operator includes a battery coupled to an electric motor acting through a mechanical driving linkage to open or close a valve. Operation of the motor is governed by the control means which may include pressure or flow responsive means and/or receiving means responsive to sonic or electrical signals transmitted from a remote location. When adapted for use in well valving, the operator is removably received within the inside pocket of a mandrel which houses a valve closure member.

28 Claims, 4 Drawing Figures

Patented May 30, 1972
3,665,955
2 Sheets-Sheet 1
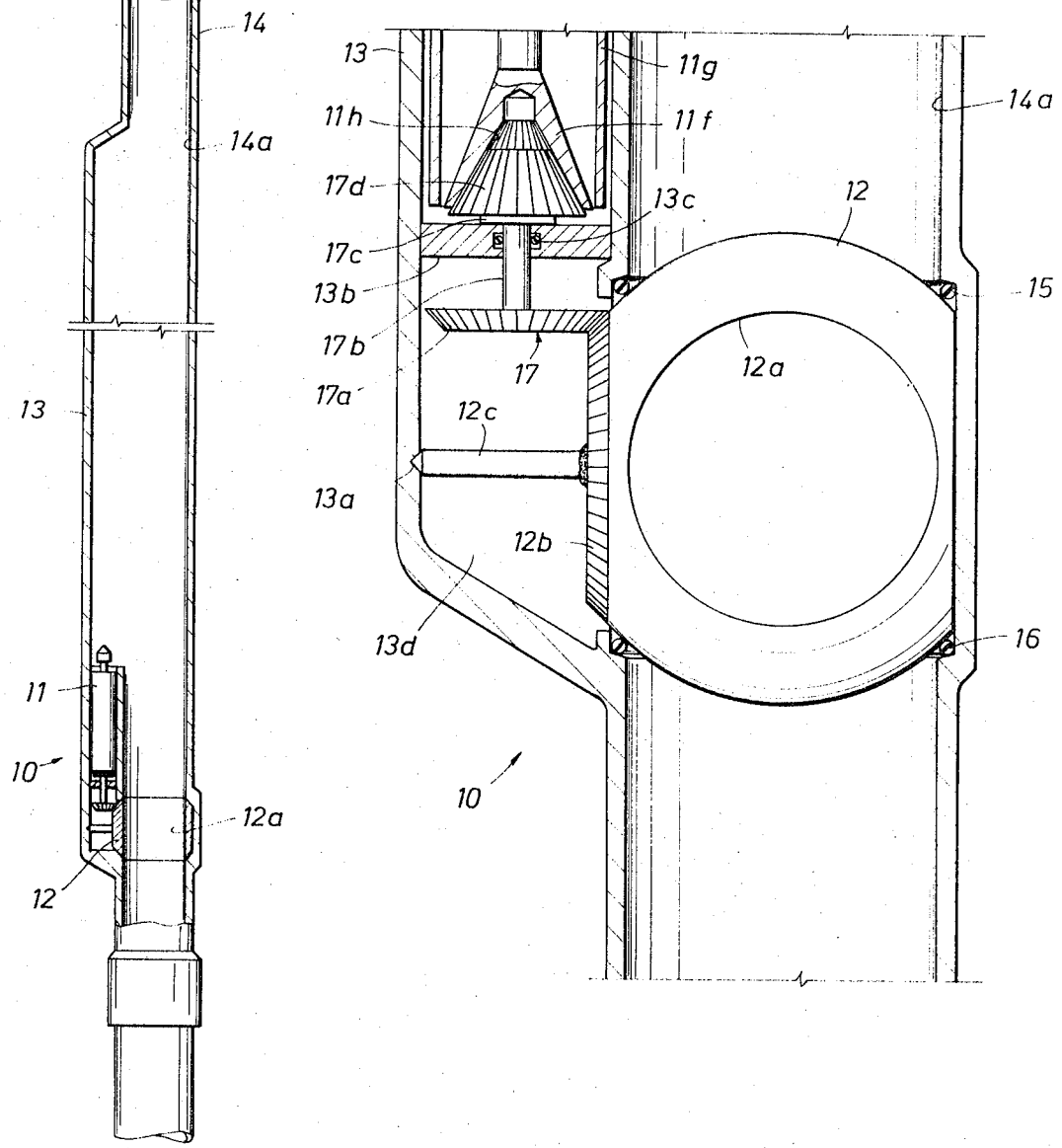
George E. Conner, Sr.
INVENTOR
BY Carlos A. Torres
ATTORNEY George E. Conner, Sr.
INVENTOR BY Carlos A. Torres
ATTORNEY

SELF-CONTAINED VALVE CONTROL SYSTEM

BACKGROUND OF THE INVENTION

1. Field of the Invention

The present invention relates to means for controlling the opening and/or closing of valves and valving means. More specifically, the present invention relates to a new and improved, self-contained power supply and operating power mechanism for partially or completely opening and/or closing valves and valving means in response to the existence of predetermined conditions within the valved fluid or in response to remotely transmitted signals. In a specific application, the present invention relates to a new and improved self-contained valve control system for terminating the flow of oil and gas in an offshore well following a "blowout".

2. Description of the Prior Art

The prior art includes a variety of devices which respond to conditions such as the pressure or fluid flow rate of a liquid or gas to open, close or otherwise regulate the flow of such fluids through a flow passage. A specific example of such devices are the common "storm chokes" customarily employed in offshore oil and gas wells which are designed to close automatically in the event of uncontrolled fluid flow through the tubing string. Such devices are normally responsive to an increase in the rate of flow through the tubing string and function to close automatically when the flow rate exceeds a predetermined maximum value.

A significant shortcoming associated with many conventional valving devices employed to automatically regulate flow in an oil or gas well is that such devices are damaged by the flow of abrasive fluids through the valve components and are sometimes prevented from operating by the accumulation of silt and sand about the movable components of the valve. In an effort to avoid valve malfunction caused by wear or the accumulated sand and silt, it is necessary to periodically remove, check and repair or replace valve components and then return the valve to its operative position within the well.

Various governmental regulatory agencies controlling the production of oil and gas from offshore and inland water areas require that safety devices such as storm chokes be installed within the well at a point below the water bottom or "mud line". As a practical matter, the entire tubing string cannot be elevated to the surface for the purpose of checking or replacing the storm choke and the prior art has suggested a variety of schemes for positioning and retrieving the valving device from its subsurface location. Such techniques generally include wireline operations in which the valve is positioned or retrieved from its subsurface location by means of appropriate tools lowered through the tubing string. Since the majority of wells requiring storm chokes are producing wells, the time required to position and remove safety devices such as storm chokes may cause a substantial loss in production time. Moreover, flow responsive devices employed to automatically regulate well flow are normally flow restrictive since the valving means and the sensing mechanism of the control are generally positioned in the flow stream. Where the natural formation pressure of the well falls below a predetermined value, flow restriction such as those imposed by the presence of storm chokes may be sufficient to prevent flow or severely restrict the volume of production through the well.

In a widely used conventional storm choke, the closure means of the valve are adapted to be disposed directly within the axial flow passage where the flow of fluid through the passage tends to close the closure members of the choke against an opening bias force imposed by a spring or the like. While in this position, access through the tubing string is restricted which prevents conventional wireline tools from being employed in the well before the choke is removed. In addition to restricting well flow, the choke is also objectionable in that its central disposition within the flow passage increases its exposure to the abrasive fluids flowing in the tubing string.

In general, the prior art lacks a satisfactory, self-contained device capable of providing dependable valve regulation at remote, inaccessible areas in flow conductors which may be easily retrieved from or positioned in the remote location for periodic inspection or repair.

SUMMARY OF THE INVENTION

In its preferred form, the apparatus of the present invention is employed to automatically regulate the extent of opening and closing of a down-hole valve disposed within a well tubing. In its broader aspects, the invention includes an assembly in which a self-contained operator is equipped with a prime mover and a power source which provides energy for the operation of the prime mover. The prime mover in turn connects with means for permitting, terminating or regulating the flow of a liquid or gas through a confining structure. The invention also includes a valving assembly which is wholly contained within a flow conductor, is operated internally of the flow conductor and includes lateral valve orifice dimensions which are substantially equal to the lateral dimensions of the main flow passage in the flow conductor.

A specific form of the invention is employed as a storm choke in an oil or gas well. In this form, the operator employed in the system of the invention may be equipped with a self-contained source of electrical potential, such as a storage battery which supplies power to an electric motor which in turn provides a mechanical movement in a drive system. The battery, motor and drive system are preferably employed in a unitary, self-contained housing which may be removably positioned within the inside pocket of a tubing mandrel where the drive system may operably engage a valving means adapted to regulate flow through a central passage extending longitudinally of the mandrel. The valving mechanism is preferably a ball valve so that when fully opened, the valve flow passage may be approximately the same size as the mandrel passage.

The housing containing the potential energy source, prime mover and drive mechanism is also provided with a control mechanism which is responsive to pressure, flow or other parameters or conditions existing within the tubing. If desired, the control mechanism may be made responsive to an electrical or sonic signal or other command signal sent from a remote location without the use of electrical conductors extending between the operator and the remote location.

In the preferred form of the invention, with the apparatus set in the side pocket of the mandrel and employing a ball valve, it is possible to provide a downhole valve which has an orifice opening substantially the same size as the opening through the tubing string without the need for a large, bulky mandrel. In this same environment, unrestricted flow through the valve is permitted which prevents wearing away of the valve closure members and decreases back pressure on the formation. In a modified form of the invention, the self-contained operator is combined with a valving means which regulates flow through the walls of the mandrel.

The foregoing and other objects and advantages of the present invention will become more apparent from the following specification and related drawing.

BRIEF DESCRIPTION OF THE DRAWINGS

FIG. 1 is a vertical elevation, in section, illustrating the preferred form of the self-contained valve control system of the present invention;

FIG. 2 is an enlarged view, partially in section, illustrating details in the construction of the present invention;

DESCRIPTION OF THE PREFERRED EMBODIMENTS

Figure 3:
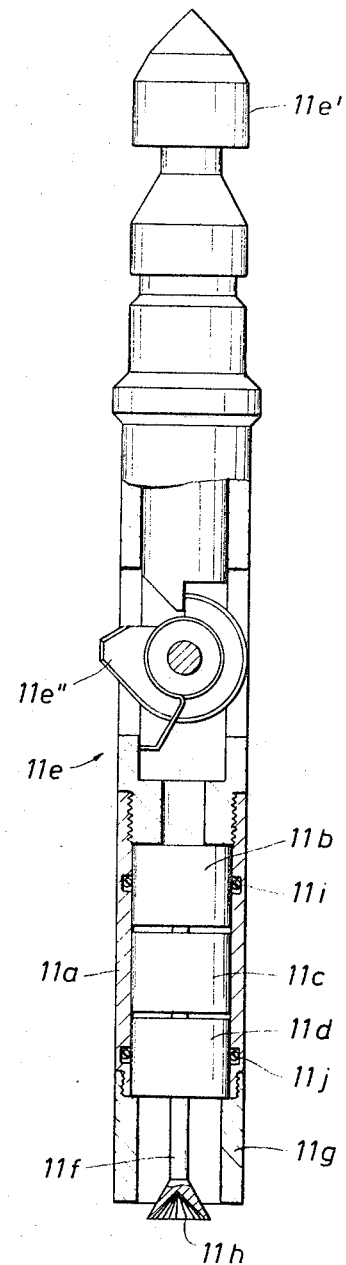
FIG. 3 is a vertical elevation, partially in section, illustrating the self-contained control mechanism, battery, motor and gear drive forming the operator of the present invention.

The preferred form of the apparatus of the present invention includes a self-contained valve operator and valve disposed within a tubing string in an oil or gas well. The operator is responsive to well conditions or to a command signal transmitted from a remote location to open or close the valve. The operator includes a control mechanism, battery, electric motor and gear drive assembled in a self-contained unit which is separably connected to the closure elements of the valve. When the control mechanism senses the existence of certain predetermined well conditions or the onset of a command signal, battery power is supplied to the motor. Rotation of the motor is transmitted through the gear drive to close or open the valve elements or to move them into some intermediate position. The operator may be positioned within or removed from the tubing with conventional wireline equipment.

The preferred form of the self-contained valve control system of the present invention is indicated generally at 10 in FIG. 1. The apparatus 10 is provided with a self-contained operator 11 which includes a control mechanism, power supply, motor and gear drive employed to rotate a ball valve closure member 12. The operator 11 is disposed within a side pocket 13 formed within a tubing mandrel 14 which also acts as a valve housing for the ball closure member 12. The mandrel 14 is adapted to be secured to a tubing string T which extends upwardly to a well head. The lower end of the mandrel (not illustrated) is similarly connected to a tubing string which extends downwardly through the well bore to a subterranean oil or gas containing formation. Rotation of the ball member 12 within the mandrel housing operates to fully or partially open or close a central mandrel passage 14a to regulate the flow of fluids through the tubing string T. The ball closure member 12 is equipped with a valve orifice 12a having a diameter which is substantially the same as the internal diameter of the central flow passages 14a and Ta of the mandrel 14 and tubing string T, respectively, to prevent any restriction to fluid flow through the assembly.

The upper end of the operator 11 is equipped with a fishing head so that it may be engaged by a suitable fishing tool (not shown), withdrawn from the side pocket 13 and removed upwardly through the tubing string T to the well head. Once retrieved, the operator may be inspected or repaired before being repositioned within the internal side pocket 13. Both the removal and replacement of the operator 11 may be effected with the tubing string T in place by the use of conventional wireline tools and techniques.

FIG. 3 illustrates a preferred construction of the operator 11. The unit 11 includes a tubular housing 11a containing a control device 11b, electrical storage battery 11c and electric motor and gear drive 11d. A conventionally shaped latch and fishing neck assembly indicated generally at 11e, is threadedly secured to the top of the housing 11a and a drive shaft 11f extends downwardly through a threadedly engaged bottom housing member 11g. The shaft 11f terminates in a concave conical gear member 11h designed to engage a mating gear in the closure mechanism of the valving assembly. Assembly 11e is equipped with a conventional fishing neck 11e' designed to be engaged by wireline equipment. A shearable, spring loaded cam 11e'' extends from the side of the assembly 11e and is adapted to engage a receiving groove formed internally of the mandrel pocket to hold the operator 11 in proper position within the mandrel. When the operator 11 is to be retrieved from the mandrel pocket, the neck 11e' is engaged by a wireline pulling tool and jarred upwardly to shear a pin which permits the cam 11e'' to rotate and release its locking engagement with the mandrel groove. The external surface of the bottom housing member 11g may be conventionally shaped to cooperate with the internal surface of the receiving mandrel pocket so that the operator 11 is automatically rotated into proper position within the pocket as it is lowered into place and is then locked against rotational movement after the latch cam 11e'' snaps into the mandrel groove. The control device 11b, battery 11c, motor and gear drive 11d may be any suitable, conventional components of the general type described in U.S. Pat. Nos. 3,438,037; 3,436,662; 3,413,608; 3,199,070; and 3,011,114. Miniature assemblies which include a control device, battery and motor and gear drive such as commonly employed to control movement in model airplanes may be advantageously employed to provide the desired movement of the operator 11.

As will be understood, the gear drive associated with the motor acts as a reduction gear to convert the relatively fast, low force rotation of the electric motor to a relatively slow, high force rotation at the gear output shaft 11f. While the motor and gear assembly 11d have been illustrated as a single component, it should be noted that each may be a separate component linked by a suitable connecting mechanism. Spaced O-ring seals 11i and 11j are disposed within the housing 11a to protect the internal components of the operator from the well fluids. The assembly 11e and bottom housing member 11g are removable to permit repair or replacement of the components encased within the housing 11a.

With reference to FIG. 2, it is seen that one side of the ball closure member 12 is milled flat to ride against a flat housing surface formed internally of the mandrel 14. The opposite side of the ball member 12 is provided with a circular gear drive 12b which extends completely around the body of the member. An auxiliary positioning pin 12c extends from the ball member 12 and is set within a mounting bore 13a formed within the wall of the mandrel pocket 13. It should be noted that the pin 12c may be omitted if desired since the flat, milled surface of the ball closure member restricts rotation of the member about a transverse axis while the housing configuration prevents the closure member from moving axially. Milling of the closure member side provides an additional advantage in that it permits the external dimensions of the mandrel 14 to be kept relatively small as required where additional tubing strings and associated valving systems are to be employed in the same well casing. Upper and lower seal rings 15 and 16, respectively, extend coaxially with the longitudinal passage 14a of the mandrel 14. The rings 15 and 16 may be formed of teflon or other suitable sealing material which cooperates with the closure member 12 to form a leakproof seal.

Rotating movement is supplied by the operator 11 and is conveyed to the ball closure member 12 by a connecting drive gear 17. The drive gear is equipped with a first circular gear drive 17a adapted to engage the gear drive 12b on the valve closure member 12. The gear drive 17a is connected to a shaft 17b which extends upwardly through the base wall 13b in the mandrel pocket, through a sliding O-ring seal 13c and through a suitable bearing 17c where it is then secured to a convex, conical cone type gear member 17d. As illustrated, the gear member 17d mates with the concave gear structure 11h extending from the base of the self-contained operator 11. The bearing 17c permits the drive gear 17 to rotate freely while the O-ring seal 13c provides a sliding seal which prevents leakage across the wall 13b. Base wall 13b forms a gear housing chamber 13d in the lower portion of the mandrel pocket 13. Preferably, the chamber 13d is filled with a suitable, incompressible liquid which lubricates the gearing components and prevents well fluids from entering the chamber.

In operation, the control mechanism 11b governs switching of the power supply of battery 11c to the motor and gear drive assembly 11b to thereby regulate rotation of the output drive shaft 11f. Once energized, the operator drive shaft 11f rotates to rotate the connecting drive gear 17. Rotation of the gear drive 17a in turn rotates the ball closure member 12 about an axis which is at right angles to the axis of the valve passage 14a. By this means, the valve aperture 12a may be rotated from a position where the axis of the aperture is substantially coincidental with the axis of the mandrel passage 14a, corresponding to full opening to the valve, or as illustrated in FIG. 2, to a position where the axis of the aperture 12a is disposed at right angles to the mandrel passage axis, corresponding to full closure of the valve. Partial rotation of the ball closure member 12 between these two extremes may be employed to regulate flow through the tubing.

The activating signal initiating operation of the control mechanism may be provided by a sensing means carried within or associated with the control mechanism 11b which is sensitive to any condition of the well fluid such as pressure, rate of fluid flow, temperature, viscosity, gas-to-liquid ratio, and so forth. Where necessary, suitable detectors may extend from the operator into the flow path of the mandrel as may be required, for example, to monitor rate of flow. In addition, the control mechanism 11b may also include a receiver which is responsive to either electrical signals or other signals such as sonar signals which are transmitted from a remote location.

Figure 4:
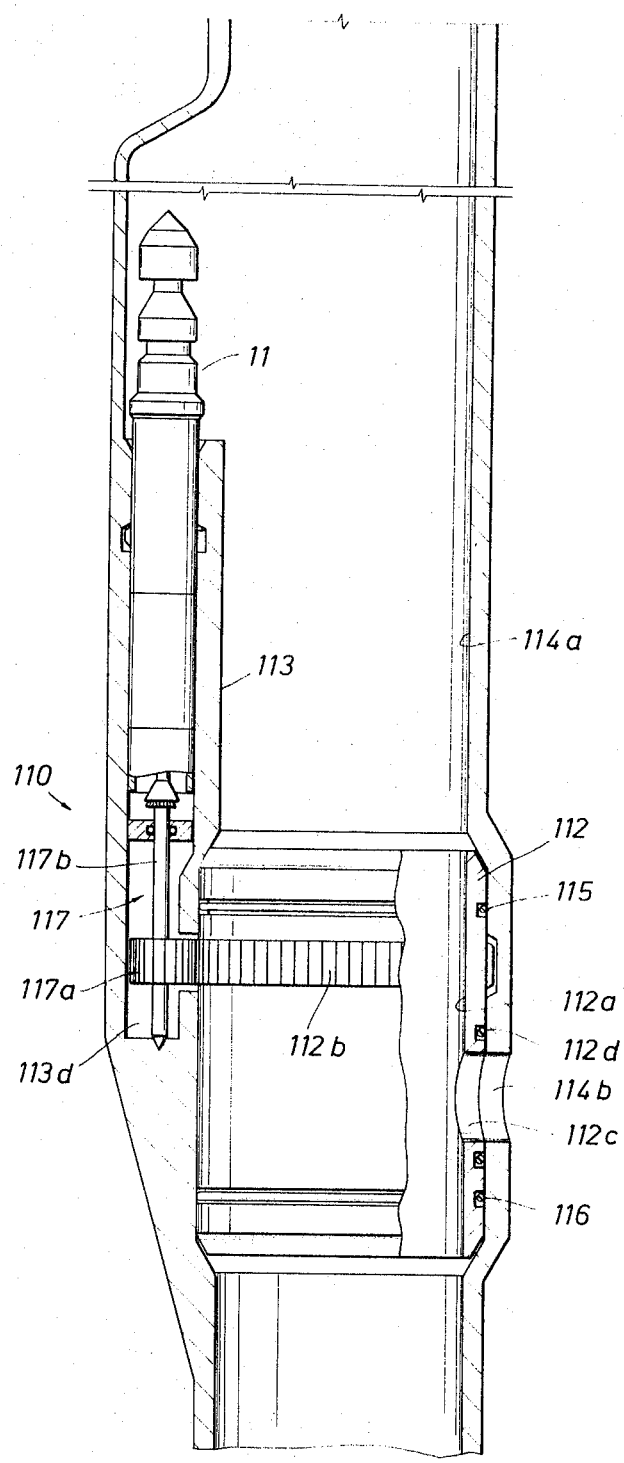
FIG. 4 is a vertical elevation, partially in section illustrating a modified form of the self-contained valve control system of the present invention designed for use in regulating flow through the walls of a tubing string.

FIG. 4 of the drawings illustrates a modified form of the system of the present invention designed for use in situations requiring flow through the walls of the well tubing. In the device of FIG. 4, the operator 11 is employed in combination with a sleeve-type closure member adapted to regulate flow through the walls of a tubular flow conductor. In the modified form of the invention, indicated generally at 110, the operator 11 (shown in dotted line) is removably positioned within the inside pocket 113 of a mandrel 114 where it engages a connecting drive mechanism 117 engaged with a rotatable valve sleeve 112. The sleeve 112 is provided with a central flow passage 112a having the same internal diameter as the mandrel passage 114a and is adapted to be rotated by movement imparted through a drive gear 117a which engages gear teeth 112b formed externally along the central body of the sleeve. The gear drive 117 and the connection between the gear drive and the operator 11 is generally similar to that previously described with reference to FIG. 2 except that the shaft 117b is mounted in the base of the chamber 113d for increased stability and the gear 117a is cylindrical to mate with the gear 112b on the sleeve 112. The valving action of the sleeve 112 is effected by moving radial bores 112c, formed in the wall of the sleeve, into and out of coincidence with radial bores 114b formed in the wall of the mandrel 114. Thus, when the bores 112c and 114b are coincident or include coincident areas, flow is permitted between the internal and external areas of the mandrel. Suitable, spaced O-rings 115 and 116 disposed between the sleeve 112 and the mandrel 114 provide a sliding seal which cooperates with the smaller O-rings 112d disposed about the radial bores 112c to prevent leakage through the walls of the assembly when the valve is rotated to its off position.

In either of the embodiments described herein, the closure member may be successively rotated to open and closed positions by rotation in the same direction or, if desired, the operator 11 may be modified so that the direction of rotation of the motor reverses after the closure member engages a stop at the open or closed positions. In both forms of the invention, it should be noted that the gear drive formed on the closure member itself is relatively large which permits a corresponding decrease in the size of the drive gear, power supply, motor and reduction gear included in the remaining portions of the system. This in turn permits a reduction in the overall external dimensions of the valve system which may be important in situations requiring a number of well conductors in the same well casing.

In the use of the system of the present invention, the operator 11 may be periodically removed from the internal mandrel pocket by a suitable wireline fishing tool which latches onto the fishing neck 11e' formed at the top of the operator. In repositioning the operator, the concave conical gear provision 11h functions to automatically engage and properly seat with the convex conical gear section of the connecting drive gear 17.

As previously noted, the control mechanism employed in the operator of the present invention may be responsive to the conditions of the fluid flowing through the mandrel and may also respond to a remotely transmitted electronic or sonic signal or the like. Where signals of the latter type are employed, the control mechanism may include appropriate response means which are activated only by properly coded signals to thereby eliminate inadvertent or unauthorized operation of the valving system. Where employed, the remote signaling is preferably capable of overriding any local sensing function of the operator so that the valving means may be automatically opened or closed by the remotely transmitted signal irrespective of conditions existing within the well. By such means, the well may be automatically shut in from a remote location when weather or other conditions threaten to damage the well installation. While the foregoing invention has been specifically described with reference to wells and the like, it will be understood that the features of the invention make it suitable for general purpose application where fluid flow is to be regulated.

The foregoing disclosure and description of the invention is illustrative and explanatory thereof, and various changes in the size, shape and materials as well as in the details of the illustrated construction may be made within the scope of the appended claims without departing from the spirit of the invention. Thus, by way of example rather than limitation, the self-contained power source employed in the operator may be a fuel cell or other source of electrical potential rather than a storage battery. Moreover, the motor may be pneumatically powered and the self-contained power supply may be a cylinder of compressed gas or may be a gas generator.

What is claimed is:

1. A self-contained valve control system comprising
   a. movable valving means for regulating fluid flow in a flow conductor;
   b. operator means including a self-contained power source and prime mover for moving said valving means to partially or completely close or open fluid flow passage means included in said valving means; and
   c. releasable connecting means included with said valving means and said operator means for imparting movement in said operator means to said valving means and disengaging or engaging said operator means and said valving means.

2. A self-contained valve control system as defined in claim 1 further including receiving means formed internally of said flow conductor for removably receiving and holding said operator means in engagement with said releasable connecting means.

3. A self-contained valve control system as defined in claim 1 wherein said movable valving means includes a movable ball valve closure member.

4. A self-contained valve control system as defined in claim 2 wherein said movable valving means includes a movable ball valve closure member.

5. A self-contained valve control system as defined in claim 1 wherein said operator means includes control means responsive to a condition or value of the fluid being valved or responsive to a remote command signal for controlling operation of said prime mover and movement of said valving means.

6. A self-contained valve control system as defined in claim 2 wherein said operator means includes control means responsive to a condition or value of the fluid being valved or responsive to a remote command signal for controlling operation of said prime mover and movement of said valving means.

7. A self-contained valve control system as defined in claim 3 wherein said operator means includes control means responsive to a condition or value of the fluid being valved or responsive to a remote command signal for controlling operation of said prime mover and movement of said valving means.

8. A self-contained valve control system as defined in claim 4 wherein said operator means includes control means responsive to a condition or value of the fluid being valved or responsive to a remote command signal for controlling operation of said prime mover and movement of said valving means.

9. A self-contained valve control system as defined in claim 1 wherein:
   a. said self-contained power source includes an electric storage battery; and b. said prime mover includes an electric motor.

10. A self-contained valve control system as defined in claim 6 wherein:
   a. said self-contained power source includes an electric storage battery; and
   b. said prime mover includes an electric motor.

11. A self-contained valve control system as defined in claim 10 wherein:
   a. said flow conductor includes axially extending wall means surrounding an axially extending conductor flow passage; and
   b. said valving means includes fluid flow passages for regulating fluid flow axially through said conductor flow passage.

12. A self-contained valve control system as defined in claim 10 wherein said movable valving means includes a movable ball valve closure member.

13. A self-contained valve control system as defined in claim 10 wherein:
   a. said flow conductor includes axially extending wall means surrounding an axially extending conductor flow passage; and
   b. said valving means includes fluid flow passages for regulating fluid flow through said wall means into and out of said conductor flow passage.

14. A self-contained valve control system as defined in claim 13 wherein said valving means includes sleeve closure means rotatable with respect to said wall means.

15. A self-contained valve control system as defined in claim 11 wherein said valving means includes ball valve closure means rotatable with respect to said wall means.

16. A self-contained valve control system as defined in claim 15 wherein said ball valve closure means includes orifice means having lateral dimensions substantially the same as the lateral dimensions of said conductor flow passage whereby fluid flow through said valving means is substantially unrestricted when said orifice means is moved into open position.

17. A self-contained valve control system as defined in claim 1 further including:
   a. closure member means in said valving means movable relative to a valve housing means whereby said closure member may be moved relative to said housing means to partially or completely open or close fluid flow through said valving means; and
   b. gear teeth drive means carried by said closure member means and linked with said releasable connecting means for imparting movement of said connecting means to said closure member means.

18. A self-contained valve control system as defined in claim 13 further including:
   a. closure member means in said valving means movable relative to a valve housing means whereby said closure member may be moved relative to said housing means to partially or completely open or close fluid flow through said valving means for imparting movement of said connecting means to said closure member means.

19. A self-contained valve control system as defined in claim 17 wherein said closure member means includes ball valve closure means.

20. A self-contained valve control system as defined in claim 19 wherein said ball valve closure means includes orifice means having lateral dimensions substantially the same as the lateral dimensions of said conductor flow passage whereby fluid flow through said valving means is substantially unrestricted when said orifice means is moved into open position.

21. A self-contained valve control system as defined in claim 16 including gear teeth drive means carried by said ball valve closure means and linked with said releasable connecting means for imparting movement of said connecting means to said ball valve closure means.

22. A self-contained valve control system as defined in claim 21 wherein said ball valve closure means includes an externally developed flat surface adapted to engage an internally developed flat surface in said wall means whereby said ball valve closure means is fixed against rotational movement along an axis substantially perpendicular to said flat surfaces.

23. A self-contained valve control system as defined in claim 1 wherein said releasable connecting means includes a concave gear means extending from said operator means and mating convex gear means extending from said valving means.

24. A self-contained valve control system as defined in claim 22 wherein said releasable connecting means includes a concave gear means extending from said operator means and mating convex gear means extending from said valving means.

25. A valve control system comprising
   a. movable ball valve means for regulating fluid flow in an axially extending conductor passage of a flow conductor; and
   b. drive means fully contained within said flow conductor for moving said ball valve means relative to said flow conductor for partially or completely opening or closing fluid flow passage means.

26. A valve control system as defined in claim 25 further including orifice means included with said ball valve means and having substantially the same lateral dimensions as said conductor passage whereby fluid flow through said ball valve means is substantially unrestricted when said ball valve means is in fully open position.

27. A valve control system defined in claim 26 further including gear teeth means carried by said ball valve means and connected with said drive means for imparting movement of said drive means to said ball valve means to partially or completely open or close said orifice means in said ball valve means.

28. A valve control system as defined in claim 27 wherein said ball valve means includes an externally developed flat surface adapted to engage an internally developed flat surface in said flow conductor whereby said ball valve means is fixed against rotational movement along an axis substantially perpendicular to said flat surfaces.

* * * * *